(12) United States Patent
Hauser

(10) Patent No.: US 8,136,445 B2
(45) Date of Patent: Mar. 20, 2012

(54) SWATH ROLLER

(76) Inventor: Keith Hauser, Melville (CA)

( * ) Notice: Subject to any disclaimer, the term of this patent is extended or adjusted under 35 U.S.C. 154(b) by 385 days.

(21) Appl. No.: 12/552,435

(22) Filed: Sep. 2, 2009

(65) Prior Publication Data

US 2011/0047950 A1   Mar. 3, 2011

(51) Int. Cl.
*B30B 15/04* (2006.01)
*A01D 43/00* (2006.01)

(52) U.S. Cl. .......................... 100/210; 56/189

(58) Field of Classification Search .............. 100/100, 100/155 R, 210; 56/6, 16.4 A, 16.4 B, 16.4 C, 56/189; 280/656
See application file for complete search history.

(56) References Cited

U.S. PATENT DOCUMENTS

| | | | | |
|---|---|---|---|---|
| 3,722,191 A * | 3/1973 | Braunberger | | 56/189 |
| 4,109,729 A * | 8/1978 | Kaercher, Jr. | | 172/1 |
| 5,596,868 A * | 1/1997 | Gerbrandt | | 56/365 |
| 2004/0070172 A1* | 4/2004 | Colistro | | 280/472 |

FOREIGN PATENT DOCUMENTS

| | | |
|---|---|---|
| CA | 599761 | 6/1960 |
| CA | 2299185 | 8/2001 |
| CA | 2311692 | 3/2003 |

* cited by examiner

*Primary Examiner* — Jimmy T Nguyen
(74) *Attorney, Agent, or Firm* — Adrian D. Battison; Ade & Company Inc.

(57) ABSTRACT

A swath roller is attached to a tractor and includes a first frame with two arms each independently connected to the tractor on an adjustable bracket allowing at least up and down movement of the arm relative to its bracket and a transverse bean across the arms. A second frame carries the roller and is supported on a pair of castor wheels spaced outwardly to respective sides of the roller. The second frame includes a front beam connected to the first frame by a center pivot so as to allow side to side pivotal movement of the second frame and two force transmitting members spaced outwardly of the pivot. Conversion to transport is provided by adding a hitch at one end of the frame and an additional wheel behind the roller at the opposite end and by locking one or more of the wheels against castoring.

17 Claims, 4 Drawing Sheets

SWATH ROLLER

This invention relates to a swath roller for attachment behind a swather tractor for rolling over the swath as it is discharged behind the tractor.

BACKGROUND OF THE INVENTION

Swath rollers are commonly provided to be towed behind a swather tractor to apply pressure onto the swath as after it is discharged from the rear of the tractor.

An example is shown in Canadian Patent No: 599,761 issued Jun. 14, 1960 by Hellegards which shows a simple cylindrical roller attached behind a towed swather.

Many manufacturers have provided towed swath rollers which comprise a wheeled frame with a forwardly extending hitch pole which attaches to the rear of the swather tractor. One example is shown in a brochure by the present Applicants where a transverse beam carried on the ground wheels has a pair of rearwardly extending arms between which is mounted a metal roller drum. The drum has a cylindrical center section with flared frusto-conical ends. The height of the drum can be adjusted on the frame to adjust the pressure on the swath, depending on the thickness of the swath. The ends of the drum can be closed by circular end plates.

This type of swath roller has achieved considerable success and many have been sold by various manufacturers.

More recently the metal drum has been replaced by a plastic rotationally molded drum. The has advantage that it does not rust and can be manufactured cheaply but it has disadvantages that it slips on the crop and therefore may not properly rotate in a rolling action. Also the drum is very light so that it may not apply the required pressure.

One example of a roller of this type is shown in Canadian Patent Application Serial No: 2,299,185 (Worms) of Koenders published Aug. 23, 2001. This provides longitudinally extending ribs on the drum to aid in causing the drum to properly rotate.

Another example is shown in Canadian Patent No: 2,311,692 (Cresswell) of Bourgault issued Mar. 11, 2003. This shows in FIG. 1 a similar arrangement of towed frame in which the width of the drum can be adjusted. In FIG. 2 is shown a different arrangement in which the roller is carried on a pair of arms extending rearwardly from the rear of the tractor. There are no ground wheels and the height of the drum is adjusted by a winch arrangement which lifts and lowers the drum frame at the rear of the arms. This arrangement manufactured by Free Form Plastics has the disadvantage that the amount of pressure on the swath is dependent only on the weight of the drum and this may be insufficient as the drum is a plastic molded drum.

In view of the disadvantages of this system, Free Form Plastics has developed recently a system in which the winch suspension system is replaced by a pair of double acting cylinders which allow the cylinders to press downwardly on the roller.

Swather tractors have in recent years become much larger and more complex with some having independent suspension of the rear wheels. Such tractors are of the type with front wheels which are independently driven to provide a steering action together with castor rear wheels which follow the direction determined by the differential speeds of the front wheels. The towed swath rollers have become inadequate to provide a suitable convenient arrangement for the operator. At the same time there has been an increased demand for swath rolling.

SUMMARY OF THE INVENTION

It is one object of the invention to provide an improved swath roller.

According to one aspect of the invention there is provided a swath roller for attachment to a swather tractor to follow the tractor along a direction of travel to roll a swath, comprising:
  a roller;
  a first frame for attachment to the tractor including two arms and a transverse beam;
  a pair of brackets, each for attachment to a rear member on the swather tractor such that the brackets are located at spaced positions across the rear of the tractor;
  each arm having a hitch coupling at a forward end for connection to a respective one of the brackets, the hitch coupling allowing at least up and down pivotal movement of the arm relative to the respective bracket;
  the transverse beam being connected across the arms generally at right angles to the direction of travel so as to be located transverse to the tractor behind the tractor;
  a second frame for carrying the roller;
  a pair of castor wheels on the second frame at positions thereon spaced outwardly to respective sides of the roller such that the castor wheels roll on the ground and locate a height of the second frame and therefore the roller carried thereon relative to the ground;
  the second frame being connected to the first frame by a coupling arrangement arranged so that the second frame is pulled by the first frame across the ground behind the tractor to guide the roller in a rolling action and so as to allow side to side pivotal movement of the second frame and therefore the roller relative to the first frame about a pivot axis generally along the direction of travel.

Preferably the second frame includes a front beam and a pair of rearwardly extending support arms each arranged to engage and support a respective end of the roller.

Preferably the front beam extends outwardly to outer ends thereof located beyond respective ends of the roller and wherein each castor wheel is mounted on a respective one of the outer ends of the front beam.

Preferably a height of the roller relative to the second frame is adjustable.

Preferably the coupling arrangement includes a center pivot member connecting the front beam of the second frame to the transverse beam of the first frame and defining the pivot axis and a pair of load transfer elements for transferring a pulling force from the transverse beam to the front beam and spaced outwardly of the center pivot member.

Preferably the load transfer elements comprise a pair of parallel plates connected to either the front beam or the transverse beam with the other of the front beam and transverse beam being located between and movable vertically relative to the parallel plates. Preferably the plates are on the transverse beam and the front beam slides between them, but this may be reversed.

Preferably the arms are adjustable longitudinally of the transverse beam.

Preferably there is provided a hitch member for connection at one end of the transverse beam to a towing vehicle arranged to pull longitudinally of the transverse beam for towing the roller in a transport position, wherein one of the castor wheels at the end of the roller opposite the hitch member includes a locking member by which the castor wheel can be locked in a rolling direction longitudinal of the transverse beam for use in the transport position, and wherein there is provided a mounting for an additional wheel at a position on a side of the roller opposite to the castor wheel at the end of the transverse beam opposite to the hitch member so that the swath roller can be towed in the transport position in the direction longitudinally of the transverse beam while supported on the two castor wheels and the additional wheel.

Preferably the additional wheel is located so that the weight of the roller is applied onto the additional wheel and the arms are supported spaced from the ground.

Preferably the height of the additional wheel can be adjusted to support the hitch couplings on the arms at a required height for connection to the tractor.

Preferably the additional wheel is a castor wheel so that the device when supported on the three wheels can be easily manoeuvred to a required position to be hitched to the swather.

Preferably the additional wheel is mounted on a beam extending rearwardly from the end of the front beam.

According to a second aspect of the invention there is provided a swath roller for attachment to a swather tractor to follow the tractor along a direction of travel to roll a swath, comprising:

a roller;

a coupling for connection to the tractor by which the roller is towed behind the tractor;

a frame construction for carrying the roller and connected to the coupling so as to be located generally at right angles to the direction of travel transverse to the tractor behind the tractor;

a pair of castor wheels on the frame construction at positions thereon spaced outwardly to respective sides of the roller such that the castor wheels roll on the ground and locate a height of the frame construction and therefore the roller carried thereon relative to the ground;

wherein there is provided a hitch member for connection at one end of the frame construction to a towing vehicle arranged to pull longitudinally of the frame construction for towing the roller in a transport position;

wherein one of the castor wheels at the end of the roller opposite the hitch member includes a locking member by which the castor wheel can be locked in a rolling direction longitudinal of the frame construction for use in the transport position;

and wherein there is provided a mounting for an additional wheel at a position on a side of the roller opposite to the castor wheel at the end of the frame construction opposite to the hitch member so that the swath roller can be towed in the transport position in the direction longitudinally of the frame construction while supported on the two castor wheels and the additional wheel.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
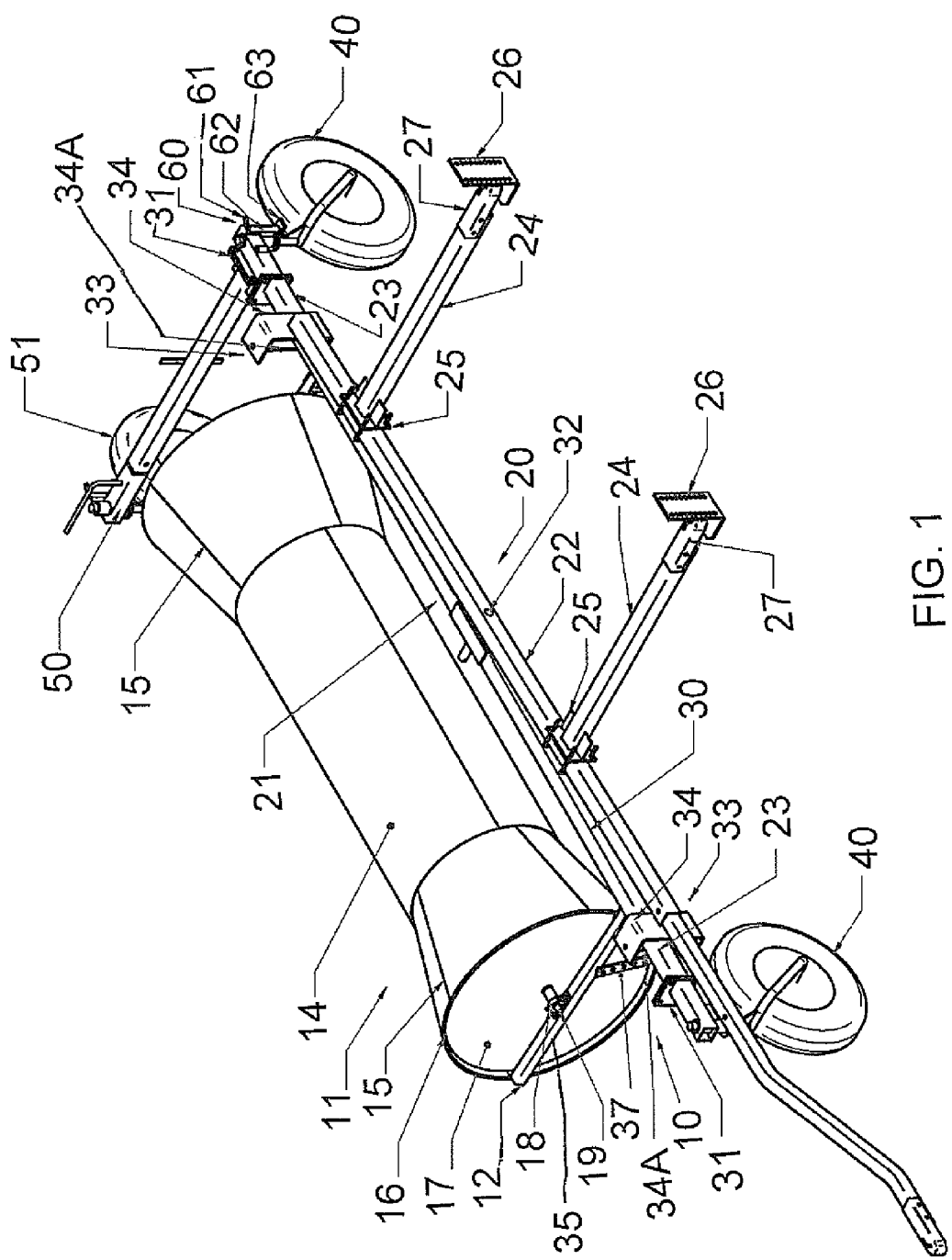
FIG. 1 is an isometric view of one embodiment of swath roller according to the present invention.
Figure 2:
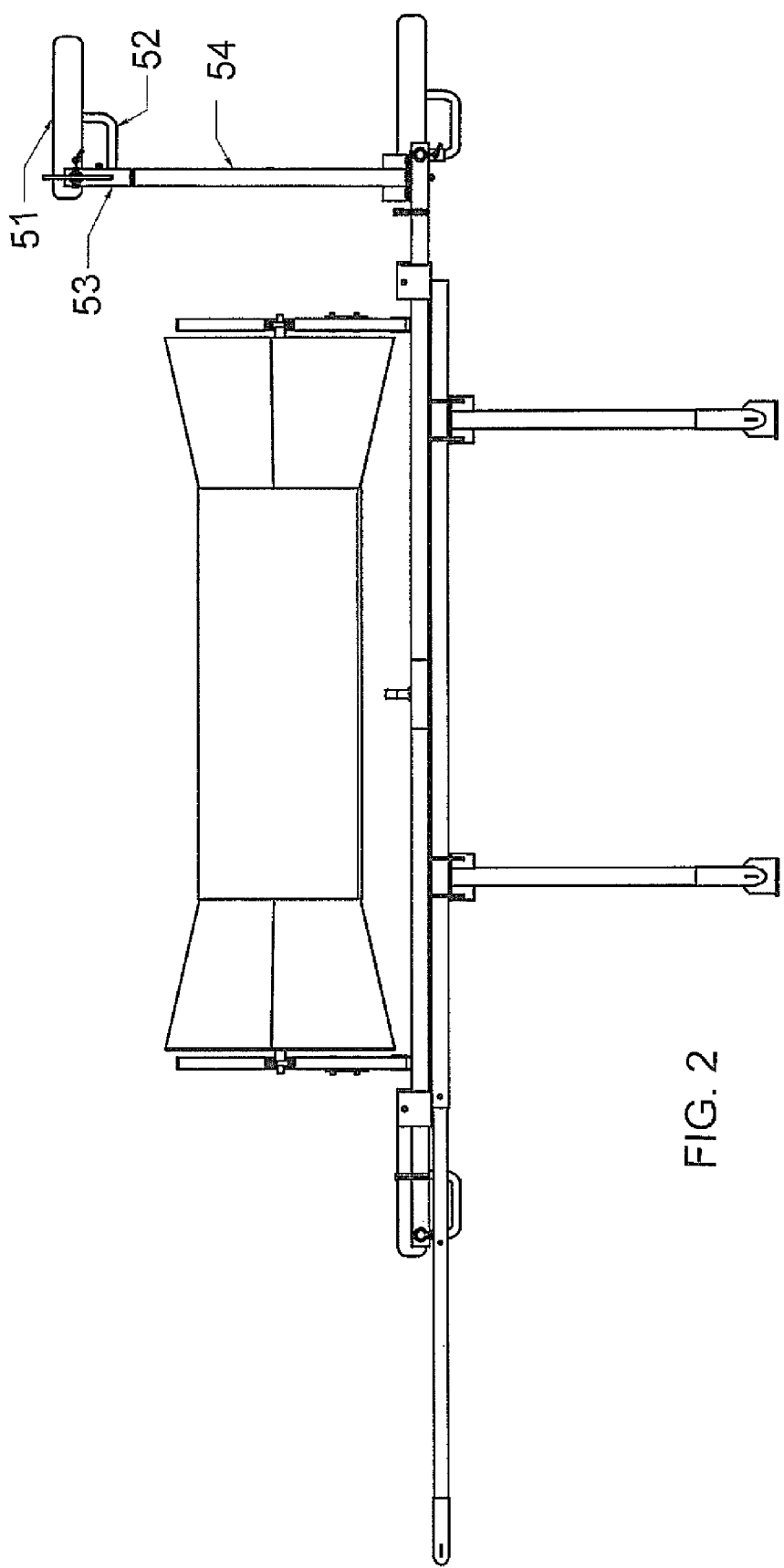
FIG. 2 is a top plan view of the swath roller of FIG. 1.
Figure 3:
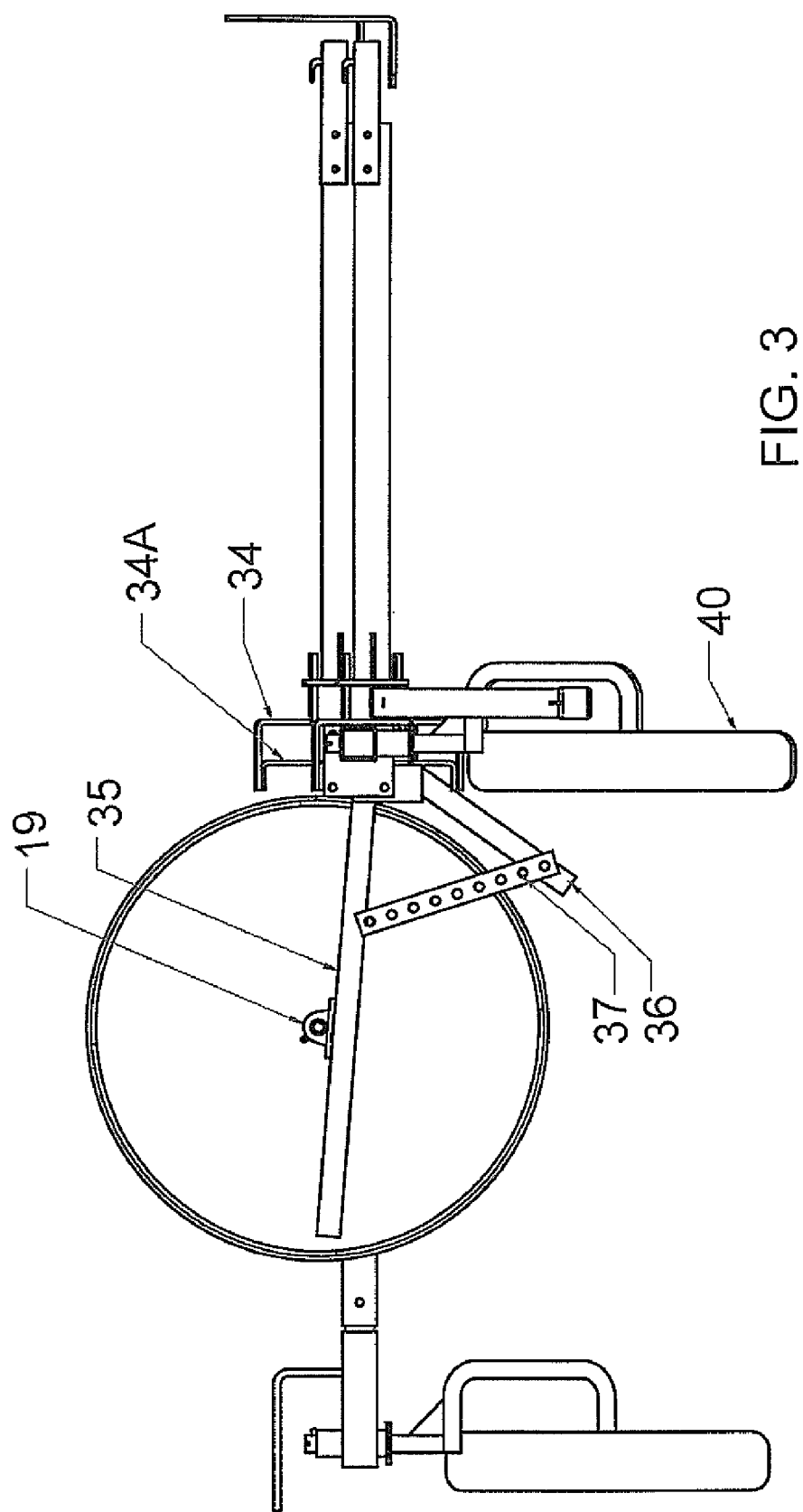
FIG. 3 is an end elevational view of the swath roller of FIG. 1.
Figure 4:
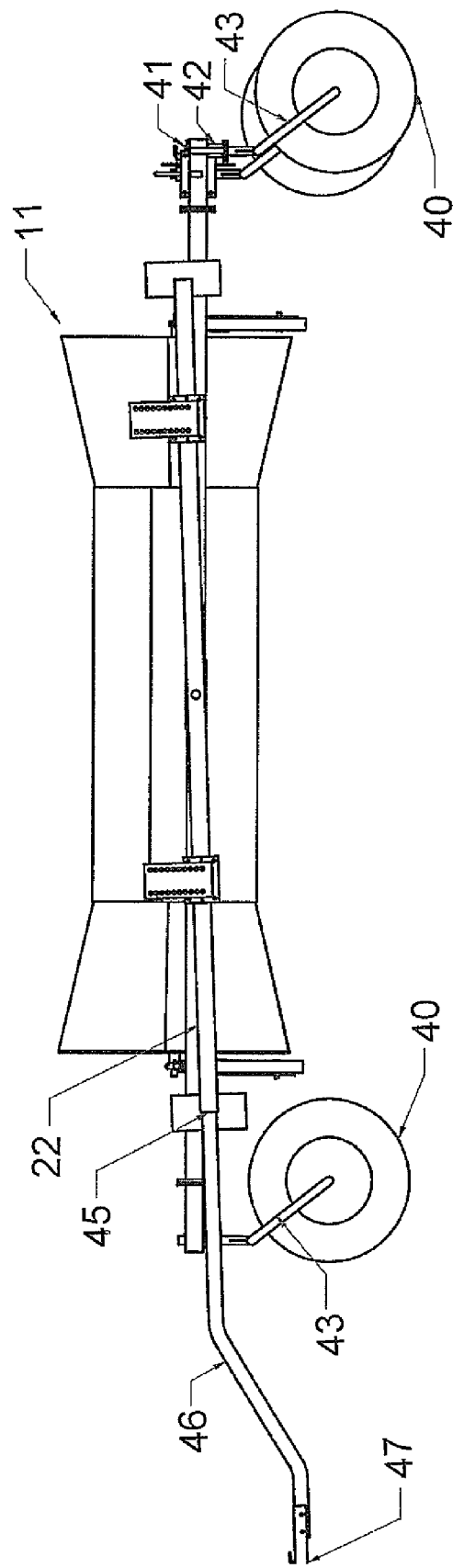
FIG. 4 is a front elevational view of the swath roller of FIG. 1.

The swath roller apparatus is generally indicated at 10 and includes a swath roller 11 mounted on a frame arrangement 12 for transportation behind a conventional swather tractor.

The roller 11 is formed of welded metal sheet and includes a central cylindrical section 14 and two flared ends 15 which are themselves frusta conical extending to an outermost edge 16 at which is located an end circular plate 17 closing the end of the roller drum. The roller is mounted on bearings 18 carried on a shaft 19 so that the shaft can be attached to the frame 12 allowing the roller to roll over the swath as the swath emerges from the rear of the tractor. The shape of the roller is a conventional shape with the central cylindrical section acting to compress the majority of the swath while the edges which are of reduced height are pinched downwardly to the ground by the frusta conical end sections.

The frame assembly includes a front frame section 20 and a rear frame section 21. The front frame section is attached to the tractor and the rear frame section carries the roller. The front frame section 20 comprises a main transverse beam 22 extending across the width of the apparatus to respective ends 23 spaced outwardly from the roller. The transverse beam 22 is attached to the tractor by a pair of arms 24 which extend forwardly from the beam to the tractor at right angles to the beam and at spaced positions along the length of the beam. The arms 24 are thus parallel and their spacing on the beam 24 can be adjusted by adjusting mounting clamps 25. At the forward end of each arm 24 is provided a mounting bracket 26 providing a hitch coupling 27 for receiving a corresponding coupling at the front of the respective arm. The height of the hitch coupling 27 can be adjusted by moving the bracket 26 on the tractor.

In the arrangement as shown and primarily used, the brackets attached to the axle of the tractor at the rear of the tractor which axle carries the conventional castor wheel of the tractor. In some cases the rear axle is a rigid transverse axle and other cases independent axle portions are provided which are independently suspended relative to the tractor body.

In other cases the tractor may include a mounting assembly for receiving the swath roller which provides mounting points for the forward end of the arms 24. In all cases the arms 24 can pivot upwardly and downwardly relative to the mounting on the tractor allowing the height on the beam 22 to move upwardly and downwardly relative to the tractor.

The roller frame 21 includes a front beam 30 which extends parallel to and alongside the transverse beam 22. The front beam 30 extends outwardly to respective ends 31 which are located beyond the ends 23 of the transverse beam. The front beam 30 is coupled to the transverse beam 23 by a center pivot coupling 32 which allows the front beam to pivot about a horizontal axis longitudinally of the direction of movement so that the respective ends of the front beam can pivot upwardly and downwardly allowing the roller to move in a similar pivoting action.

Pulling force from the transverse beam is transferred to the front beam by a force communication device generally indicated at 33 which comprises a pair of parallel plates 34 and 34A attached to the end 23 of the transverse beam. Conveniently these two plates are held in parallel position by providing C-shape at the top and bottom thus defining horizontal flanges which are clamped together to hold the plates parallel and vertical. The front one of the plates is attached to the end 23 of the transverse beam thus holding the plates at spaced positions with the front beam 30 passing therethrough. Thus the front beam can slide upwardly and downwardly within the channel defined by the parallel plates and pulling force which is mis aligned with the longitudinal direction, for example of course by steering of the tractor, is transmitted at positions spaced outwardly at the center pivot by the load transmitting elements. In this way high loads at the center pivot are moved outwardly to these load transmitting elements to ensure that sufficient force can be transmitted from the front frame to the frame carrying the roller.

The roller shaft 19 is carried on a pair of arms 35 which extend rearwardly from the front beam 30. These arms are supported at a predetermined height relative to the front roller by supporting the arms on a fixed downwardly inclined support beam 36. An adjustable brace 37 extends between the fixed beam 36 and the support arm 35 so that the operator can adjust the length of the brace thus moving the roller upwardly and downwardly relative to the fixed beam 37 and therefore relative to the front beam 30. The arms 35 extend beyond the shaft of the roller to provide a rear handle portion which can be lifted by the operator thus providing sufficient leverage for the operator to lift the weight of the roller and provide the necessary adjustment at the brace 37.

The length of the arms 24 is such that the beams are carried at a position spaced rearwardly of the tractor sufficiently to clear the rear castor wheels of the tractor.

The ends of the front beam 30 as indicated at 31 are each carried on a respective one of a pair of castor wheels 40 of a conventional construction. Thus a bracket 41 is mounted on the end of the front beam and this carries a vertical support 42 for the arm 43 of the castor wheel 40. The arm is arranged so that the axis of the castor wheel when the roller system is operating in the field is located approximately in line with the axis of the roller 11. Thus the two castor wheels are located outwardly beyond the end of the roller and provide support for the ends of the roller so as to locate the height of the roller relative to the ground. Thus in all cases the roller is supported away from the ground and rolls on the swath with sufficient pressure downwardly onto the swath to compress the swath while avoiding the roller contacting or running on the ground.

At one end of the transverse beam 22 is provided a receptacle 45 for a hitch bar 46 with a hitch coupling 47 for connection to a towing vehicle such as another tractor or a farm pickup vehicle. This defines therefore a front end of the roller system during transportation with the transportation taking place in a direction at right angles to the normal working direction. Thus in transport towing takes place along the direction of the beams with a hitch at the forward end and one of the castor wheels 40 at the forward end underneath the hitch.

At the other end which is the rear end in the towing position, there is provided a mounting 50 for an additional wheel 51 also in the form of a castor wheel with a castor wheel arm 52. This is mounted on a bracket 53 carried on the end of a beam 54 rigidly attached to the end 31 of the front beam 30 at the rear end of the device in transport. The mounting 50 includes a bracket which allows the mounting 53 to be adjusted vertically in height so as to lift the beam 54 at the end of the beam upwardly and downwardly relative to the front beam 30. It will be appreciated that this upward and downward adjustment of the beam 54 tilts the apparatus about the castor wheels 40 so as to raise and lower the hitch ends of the arms 24. With the additional wheel 51 in place, therefore, the arms 24 are maintained at a height spaced from the ground which is approximately equal to the height for attachment to the brackets 26. In the transport position, therefore, when the arms are disconnected from the swather tractor the device is towed longitudinally of the roller with the arms projecting outwardly to the side on one side of the front beam and the roller projecting outwardly to the other side of the front beam. This arrangement provides a width of transportation which is sufficiently narrow to accommodate most transportation situations.

In order that the system be towed stably, the rear castor wheel 40 includes a locking system 60 with a pin 61 which slides through a sleeve 62 and engages into a hole in a flange 63 attached to the arm 43 of the castor wheel 40. This acts to lock the wheel 40 at the rear in the transport position in the longitudinal transport direction. Similarly the additional wheel 51 can also be locked in this direction to provide a stable position at the rear. The front castor wheel 40 at the hitch remains unlocked during transport so that it can turn from side to side to provide a steering action relative to the towing vehicle.

All of the wheels can castor in order that a single operator can push the device up to the rear of the swather and manoeuvre it to the required position to locate it properly for connection. When in transport the rear two wheels are locked to prevent the castoring action.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A swath roller apparatus for attachment to a swather tractor to follow the tractor along a direction of travel to roll a swath, comprising:
    a roller;
    a first frame for attachment to the tractor including two arms and a transverse beam;
    a pair of brackets, each for attachment to a rear member on the swather tractor such that the brackets are located at spaced positions across the rear of the tractor;
    each arm having a hitch coupling at a forward end for connection to a respective one of the brackets, the hitch coupling allowing at least up and down pivotal movement of the arm relative to the respective bracket;
    the transverse beam being connected across the arms generally at right angles to the direction of travel so as to be located transverse to the tractor behind the tractor;
    a second frame for carrying the roller;
    a pair of castor wheels on the second frame at positions thereon spaced outwardly to respective sides of the roller such that the castor wheels roll on the ground and locate a height of the second frame and therefore the roller carried thereon relative to the ground;
    the second frame being connected to the first frame by a coupling arrangement arranged so that the second frame is pulled by the first frame across the ground behind the tractor to guide the roller in a rolling action and so as to allow side to side pivotal movement of the second frame and therefore the roller relative to the first frame about a pivot axis generally along the direction of travel.

2. The swath roller apparatus according to claim 1 wherein the second frame includes a front beam and a pair of rearwardly extending support arms each arranged to engage and support a respective end of the roller.

3. The swath roller apparatus according to claim 2 wherein the front beam extends outwardly to outer ends thereof located beyond respective ends of the roller and wherein each castor wheel is mounted on a respective one of the outer ends of the front beam.

4. The swath roller apparatus according to claim 1 wherein a height of the roller relative to the second frame is adjustable.

5. The swath roller apparatus according to claim 1 wherein the coupling arrangement includes a center pivot member connecting the front beam of the second frame to the transverse beam of the first frame and defining the pivot axis and a pair of load transfer elements for transferring a pulling force from the transverse beam to the front beam and spaced outwardly of the center pivot member.

6. The swath roller apparatus according to claim 5 wherein the load transfer elements comprise a pair of parallel plates connected to either the front beam or the transverse beam with the other of the front beam and transverse beam being located between and movable vertically relative to the parallel plates.

7. The swath roller apparatus according to claim 1 wherein the arms are adjustable longitudinally of the transverse beam.

8. The swath roller apparatus according to claim 1 wherein there is provided a hitch member for connection at one end of the transverse beam to a towing vehicle arranged to pull longitudinally of the transverse beam for towing the roller in a transport position, wherein one of the castor wheels at the end of the roller opposite the hitch member includes a locking member by which the castor wheel can be locked in a rolling direction longitudinal of the transverse beam for use in the transport position, and wherein there is provided a mounting for an additional wheel at a position on a side of the roller opposite to the castor wheel at the end of the transverse beam opposite to the hitch member so that the swath roller can be towed in the transport position in the direction longitudinally of the transverse beam while supported on the two castor wheels and the additional wheel.

9. The swath roller apparatus according to claim 8 wherein the additional wheel is located so that the weight of the roller is applied onto the additional wheel and the arms are supported spaced from the ground.

10. The swath roller apparatus according to claim 8 wherein the height of the additional wheel can be adjusted to support the hitch couplings on the arms at a required height for connection to the tractor.

11. The swath roller apparatus according to claim 8 wherein the additional wheel is a castor wheel.

12. The swath roller apparatus according to claim 8 wherein the additional wheel is mounted on a beam extending rearwardly from the end of the front beam.

13. A swath roller apparatus for attachment to a swather tractor to follow the tractor along a direction of travel to roll a swath, comprising:
a roller;
a coupling for connection to the tractor by which the roller is towed behind the tractor;
a frame construction for carrying the roller and connected to the coupling so as to be located generally at right angles to the direction of travel transverse to the tractor behind the tractor;
a pair of castor wheels on the frame construction at positions thereon spaced outwardly to respective sides of the roller such that the castor wheels roll on the ground and locate a height of the frame construction and therefore the roller carried thereon relative to the ground;
wherein there is provided a hitch member for connection at one end of the frame construction to a towing vehicle arranged to pull longitudinally of the frame construction for towing the roller in a transport position;
wherein one of the castor wheels at the end of the roller opposite the hitch member includes a locking member by which the castor wheel can be locked in a rolling direction longitudinal of the frame construction for use in the transport position;
and wherein there is provided a mounting for an additional wheel at a position on a side of the roller opposite to the castor wheel at the end of the frame construction opposite to the hitch member so that the swath roller can be towed in the transport position in the direction longitudinally of the frame construction while supported on the additional wheel and at least one of the two castor wheels.

14. The swath roller apparatus according to claim 13 wherein the additional wheel is located so that the weight of the roller is applied onto the additional wheel and the coupling is supported spaced from the ground.

15. The swath roller apparatus according to claim 13 wherein the height of the additional wheel can be adjusted to support the coupling at a required height for connection to the tractor.

16. The swath roller apparatus according to claim 13 wherein the additional wheel is a castor wheel.

17. The swath roller apparatus according to claim 13 wherein the additional wheel is mounted on a beam extending rearwardly from an end of the frame construction.

* * * * *